United States Patent
Stevenson et al.

(10) Patent No.: US 7,543,520 B2
(45) Date of Patent: Jun. 9, 2009

(54) EXTENSION HOUSING TO TRANSMISSION CASE ATTACHMENT

(75) Inventors: Paul D. Stevenson, Ann Arbor, MI (US); Edwin T. Grochowski, Howell, MI (US); Jeffrey J. Biallas, Dexter, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 364 days.

(21) Appl. No.: 11/341,779

(22) Filed: Jan. 27, 2006

(65) Prior Publication Data

US 2007/0175294 A1    Aug. 2, 2007

(51) Int. Cl.
     *F16H 57/04*     (2006.01)
     *F16H 61/00*     (2006.01)

(52) U.S. Cl. .................................................. 74/606 R

(58) Field of Classification Search ............... 74/606 R; 180/344
See application file for complete search history.

(56) References Cited

U.S. PATENT DOCUMENTS

| | | | | |
|---|---|---|---|---|
| 4,682,534 A | * | 7/1987 | Sumiya et al. ............. | 92/130 R |
| 4,745,816 A | * | 5/1988 | Horiuchi et al. ............... | 74/467 |
| 5,211,272 A | * | 5/1993 | Asari et al. ................ | 192/12 B |
| 6,499,548 B2 | * | 12/2002 | Wesley ...................... | 180/53.1 |
| 6,644,440 B2 | * | 11/2003 | Kageyama et al. ......... | 184/11.2 |

* cited by examiner

*Primary Examiner*—Tisha D Lewis

(57) ABSTRACT

A transmission includes a transmission case, which defines a generally cylindrical bore that is sufficiently configured to pilot a fastening block member therein. A generally annular groove is defined by the transmission case and is sufficiently dimensioned to receive a snap ring. The snap ring operates to limit the axial movement of the fastening block member with respect to the generally cylindrical bore. An extension housing having a hub portion is also provided. A flange portion extends generally radially outward from the hub portion. The flange portion defines at least one bore that is sufficiently configured to receive a threaded fastener. Similarly, the fastening block defines at least one threaded bore sufficiently axially aligned and configured such that the fastener can threadingly engage the fastening block to secure the extension housing with respect to the case.

17 Claims, 1 Drawing Sheet

EXTENSION HOUSING TO TRANSMISSION CASE ATTACHMENT

TECHNICAL FIELD

The present invention relates to a vehicular transmission and more specifically to an apparatus for attaching an extension housing to a transmission case.

BACKGROUND OF THE INVENTION

A typical multiple speed automatically shiftable vehicular transmission includes a housing or case having a plurality of planetary gear sets supported within the case. A plurality of fluid actuated clutches and brakes, operatively associated with various ring gears, sun gears, and planet carriers of the planetary gear sets, operate to establish various speed ratios or power flow paths through the transmission. Often, these clutches and brakes are arranged along longitudinal axes of the transmission with each including an annular cylinder for pressurized fluid and a complementary piston reciprocally movable in each cylinder for applying pressure to friction discs to effect clutching or braking. In order to structurally support fixed or rotating elements of those clutches and brakes located toward the middle of the case, it is customary to employ a structural member known as a center support. Typically, center supports are bolted or otherwise held with respect to the case and provide bearing surfaces for rotating elements. Additionally, an extension housing may be provided to close or seal one end of the transmission case. The extension housing is typically bolted to the case for additional support and to seal the case from fluid leakage.

By integrally casting the center support and the case, the stiffness of the case will tend to increase. However, the draft required from the center support to the rear of the case, for a typical casting operation, increases the diameter of the case. In some instances, this increase in the diameter of the case may make the placement of extension housing bolting bosses about the outside periphery of the case impossible or impractical due to vehicular packaging constraints.

SUMMARY OF THE INVENTION

A transmission housing assembly includes a transmission case defining a bore that is sufficiently configured to receive a fastening block member. The fastening block member is secured with respect to the transmission case. Also provided is an extension housing sufficiently configured to receive at least one fastener. Each of the at least one fasteners operate to engage the fastening block member, thereby securing the extension housing with respect to the transmission case.

The fastening block member may be secured with respect to the transmission case by a retaining ring, such as a snap ring, disposed within a groove defined by the transmission case. A first seal, such as an elastomeric o-ring, may be disposed between the fastening block member and the transmission case. A second seal, such as an elastomeric o-ring, may be disposed between the fastening block member and the extension housing. A center support member may also be provided and is formed integrally with the transmission case. The fastening block member may pilot within the bore defined by the transmission case. Similarly, the extension housing may pilot within the bore defined by the transmission case.

Additionally, a transmission is provided having a transmission case defining a generally cylindrical bore sufficiently configured to pilot a fastening block member therein. An extension housing is also provided. An annular groove is defined by the transmission case and is sufficiently configured to receive a retaining ring. The retaining ring operates to limit the axial movement of the fastening block member within the bore. At least one fastener operates to engage the fastening block member to secure the extension housing with respect to the transmission case. The fastener urges the fastening block member against the retaining ring and, in reaction, the extension housing is drawn to the transmission case.

The extension housing may include a hub portion. The fastening block member defines a generally cylindrical bore sufficiently configured to receive at least a portion of the hub portion therein. A first seal may be disposed between the hub portion and the fastening block member. A second seal may be disposed between the transmission case and the fastening block member. The extension housing may also include a generally annular axially extending lip portion to pilot the extension housing into engagement with the generally cylindrical bore of the transmission case. A center support member, formed integrally with the transmission case, may also be provided.

The above features and advantages and other features and advantages of the present invention are readily apparent from the following detailed description of the best modes for carrying out the invention when taken in connection with the accompanying drawing.

DESCRIPTION OF THE PREFERRED EMBODIMENT

Figure 1:
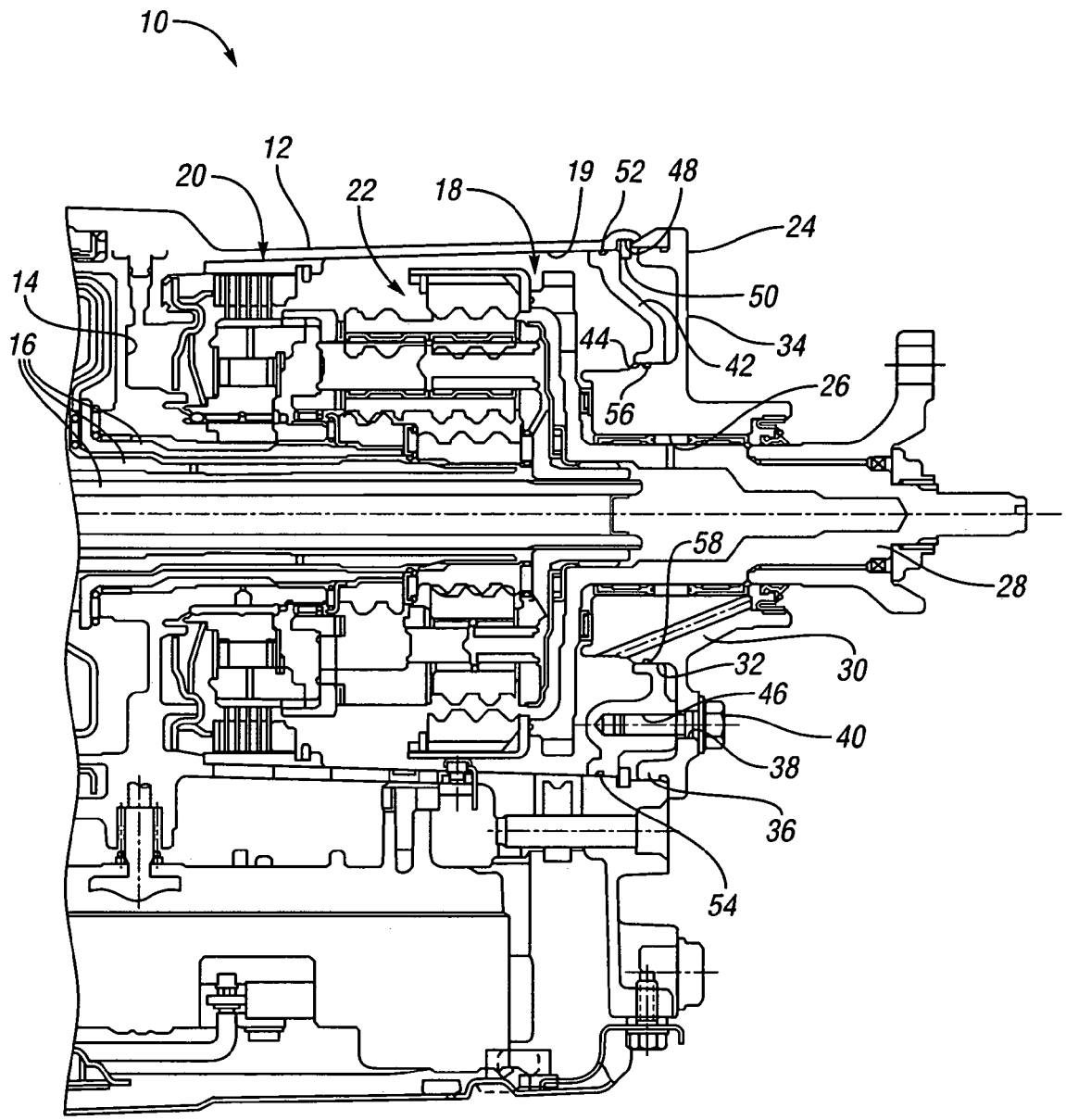
FIG. 1 is a fragmentary cross sectional side elevational view of a vehicular transmission illustrating aspects consistent with the present invention.

Referring to FIG. 1 there is shown a cross sectional side elevational view of a portion of a vehicular transmission, generally indicated at 10. The transmission 10 is an automatically shiftable power transmission, the operation of which is known to those skilled in the art. The transmission 10 includes a housing or case 12 that preferably incorporates a cast in place or integrally formed center support member 14 sufficiently configured to provide support to a plurality of rotatable shafts 16. The case 12 defines a bore 18, having a generally cylindrical surface 19, within which various operational components of the transmission 10 are contained, such as torque transmitting mechanisms 20 and planetary gearsets 22. An extension housing 24 is provided to seal the case 12 and define a bore 26, which is sufficiently configured such that an output shaft 28 of the transmission 10 can pass therethrough. Additionally, the extension housing 24 provides a measure of support to the output shaft 28 and may provide an attachment point for additional transmission components such as a transfer case and transmission mounts, not shown. The extension housing 24 includes a generally axially extending hub portion 30 having an outer surface 32 and defining the bore 26. Additionally, the extension housing 24 includes a generally radially outwardly extending flange portion 34 extending from the hub portion 30. A generally axially extending circumferential lip 36 is provided at the outer periphery of the flange portion 34 and is sufficiently configured to cooperate with the surface 19 to pilot the extension housing 24 within the case 12. The flange portion 34 defines a plurality of bores 38, one of which is shown in FIG. 1, each of which is substantially configured to receive a fastener 40 therein. Preferably, the bores 38 will be radially spaced equi-angularly about the flange portion 34. In the preferred embodiment, the fastener 40 will be a threaded fastener such as, for example, a hex head bolt, Allen head bolt, stud and nut, etc.

The bore 18 is sufficiently configured to pilot a fastening block member 42 therein. The fastening block member 42 defines a generally cylindrical bore 44 and a plurality of threaded bores 46, one of which is shown in FIG. 1. Each of the threaded bores 46 are axially aligned with a respective one of the plurality of bores 38 defined by the extension housing 24 such that the fastener 40 can threadingly engage a respective one of the plurality of threaded bores 46. In the preferred embodiment, the threaded bores 46 are blind, that is, the threaded bores do not extend through the fastening block member 42. The bore 44 is sufficiently configured to receive a section of the hub portion 30.

An annular groove 48 is defined by the case 12 and opens radially inwardly toward the bore 18. The annular groove 48 is sufficiently configured to receive at least a portion of a retaining ring 50, such as a snap ring, therein. The retaining ring 50 cooperates with the annular groove 48 to retain and limit the axial movement of the fastening block member 42 within the case 12. An annular seal 52 is disposed within an annular groove 54 defined by the fastening block member 42. The annular seal 52, such as an elastomeric o-ring, sealingly engages the surface 19 of the bore 18 thereby disallowing the passage of transmission fluid between the fastening block member 42 and the case 12. Similarly, an annular seal 56, such as an elastomeric o-ring, is disposed within an annular groove 58 defined by the hub portion 30 of the extension housing 24. The annular seal 56 sealingly engages the bore 44 thereby disallowing the passage of transmission fluid between the fastening block member 42 and the extension housing 24.

To assemble the extension housing 24 to the case 12, the fastening block member 42 is piloted within the bore 18 and sealingly engages the surface 19 of the case 12. The retaining ring 50 is then inserted into the annular groove 48, thereby axially positioning and limiting the axial movement of the fastening block member 42 within the bore 18. The circumferential lip 36 of the extension housing 24 pilots within the bore 18. The hub portion 30 of the extension housing 24 sealingly engages the bore 44 of the fastening block member 42. The fasteners 40 threadingly engage the threaded bores 46 such that as the fasteners 40 are tightened, the fastening block member 42 is urged against the retaining ring 50 and, in reaction, the extension housing 24 is drawn to the case 12. The annular seals 52 and 56 and the blind nature of the threaded bores 46 cooperate to prevent transmission fluid from contacting the fasteners 40, thereby obviating the need to seal the fasteners 40 to prevent external leakage of transmission fluid.

While the best modes for carrying out the invention have been described in detail, those familiar with the art to which this invention relates will recognize various alternative designs and embodiments for practicing the invention within the scope of the appended claims.

The invention claimed is:

1. A transmission housing assembly comprising:
   a transmission case defining a bore sufficiently configured to receive a fastening block member;
   wherein said fastening block member is secured with respect to said transmission case by a retaining ring disposed within a groove defined by said transmission case;
   at least one fastener;
   an extension housing sufficiently configured to receive said at least one fastener; and
   wherein said at least one fastener is operable to engage said fastening block member to secure said extension housing with respect to said transmission case.

2. The transmission housing assembly of claim 1, wherein said fastening block member sealingly engages said transmission case and said extension housing.

3. The transmission housing assembly of claim 1, further comprising:
   a first seal, said first seal being disposed between said fastening block member and said transmission case; and
   a second seal, said second seal being disposed between said fastening block member and said extension housing.

4. The transmission housing assembly of claim 3, wherein said first and said second seals are elastomeric o-rings.

5. The transmission housing assembly of claim 1, further comprising:
   a center support member; and
   wherein said center support member is formed integrally with said transmission case.

6. The transmission housing assembly of claim 1, wherein said fastening block member pilots within said bore defined by said transmission case; and
   wherein said extension housing pilots within said bore defined by said transmission case.

7. The transmission housing assembly of claim 1, wherein said retaining ring is a snap ring.

8. A transmission comprising:
   a transmission case defining a generally cylindrical bore sufficiently configured to pilot a fastening block member therein;
   an extension housing;
   an annular groove defined by said transmission case, said annular groove being sufficiently configured to receive a retaining ring;
   wherein said retaining ring is operable to limit the axial movement of said fastening block member within said bore;
   at least one fastener; and
   wherein each of said at least one fastener is operable to engage said fastening block member to secure said extension housing with respect to said transmission case.

9. The transmission of claim 8, wherein said extension housing includes a hub portion;
   wherein said fastening block member defines a generally cylindrical bore sufficiently configured to receive at least a portion of said hub portion therein; and
   wherein a first seal is disposed between said hub portion and said fastening block member.

10. The transmission of claim 8, wherein said extension housing includes a generally annular axially extending lip portion; and
    wherein said generally annular axially extending lip portion pilots said extension housing into engagement with said generally cylindrical bore of said transmission case.

11. The transmission of claim 8, wherein a second seal is disposed between said fastening block member and said transmission case.

12. The transmission of claim 8, further comprising:
    a center support member; and
    wherein said center support member is formed integrally with said transmission case.

13. The transmission of claim 8, wherein said retaining ring is a snap ring.

14. A transmission comprising:

a transmission case defining a generally cylindrical bore, said generally cylindrical bore being sufficiently configured to pilot a fastening block member therein;

a generally annular groove defined by said transmission case, said generally annular groove being sufficiently dimensioned to receive a snap ring;

wherein said snap ring is operable to limit the axial movement of said fastening block member with respect to said generally cylindrical bore;

an extension housing having a hub portion, wherein a flange portion extends generally radially outward from said hub portion, wherein a generally annular lip portion extends generally axially from said flange portion, said generally annular lip being operable to pilot said extension housing within said generally cylindrical bore, wherein said flange portion defines at least one bore, and wherein each of said at least one bore is sufficiently configured to receive a threaded fastener; and wherein said fastening block defines at least one threaded bore sufficiently axially aligned and configured such that said fastener can threadingly engage said fastening block to secure said extension housing with respect to said case.

15. The transmission of claim 14, further comprising:

a first seal, said first seal being disposed between said fastening block member and said transmission case; and a second seal, said second seal being disposed between said fastening block member and said extension housing.

16. The transmission of claim 15, wherein said first and said second seal are elastomeric o-rings.

17. The transmission of claim 14, further comprising:

a center support member; and wherein said center support member is formed integrally with said transmission case.

* * * * *